Figure 1:
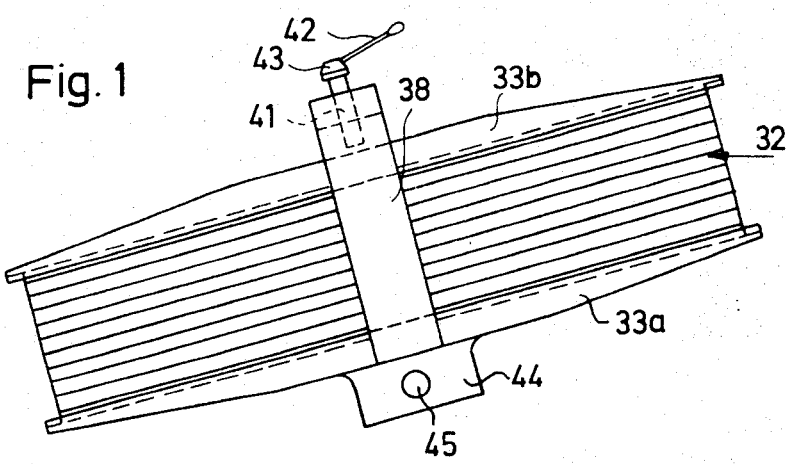

United States Patent [19]
Johansson

[11] 3,966,612
[45] June 29, 1976

[54] DIALYSIS APPARATUS FOR PURIFICATION OF A MEDIUM, PREFERABLY BLOOD

[76] Inventor: Paul-Johny Johansson, Bankgatan 14, S-223 52 Lund, Sweden

[22] Filed: Dec. 10, 1973

[21] Appl. No.: 423,393

[30] Foreign Application Priority Data
Sept. 13, 1973 Sweden............................ 7312461

[52] U.S. Cl............................ 210/238; 210/321 A
[51] Int. Cl.$^2$........................................ B01D 31/00
[58] Field of Search..................... 210/232, 321, 238

[56] References Cited
UNITED STATES PATENTS

| | | | |
|---|---|---|---|
| 3,397,141 | 8/1968 | Nakai............................. | 210/321 X |
| 3,516,548 | 6/1970 | Alwall et al..................... | 210/321 |
| 3,585,131 | 6/1971 | Esmond........................... | 210/321 |
| 3,631,986 | 1/1972 | Sausse............................. | 210/321 |
| 3,723,305 | 3/1973 | Radford.......................... | 210/321 X |
| 3,734,298 | 5/1973 | Riede et al...................... | 210/321 |
| 3,827,563 | 8/1974 | Bue et al......................... | 210/321 |

OTHER PUBLICATIONS
Ulmschneider et al., "Artificial Dialyzing Body Organ", Def. Pub. T867,005, 210-321, 10-1969.

Primary Examiner—Frank A. Spear, Jr.
Attorney, Agent, or Firm—John J. Dennemeyer

[57] ABSTRACT

A dialysis apparatus for the purification of a fluid comprises at least one substantially flat plate having a passage system on at least one side, said passage system being adapted to be connected to inlet and outlet lines for the fluid to be purified, at least one further substantially flat plate having a passage system on at least one side, said passage system being adapted to be connected to inlet and outlet lines for a purification fluid, and at least one diaphragm disposed between the sides of the plates provided with the passage systems.

9 Claims, 11 Drawing Figures

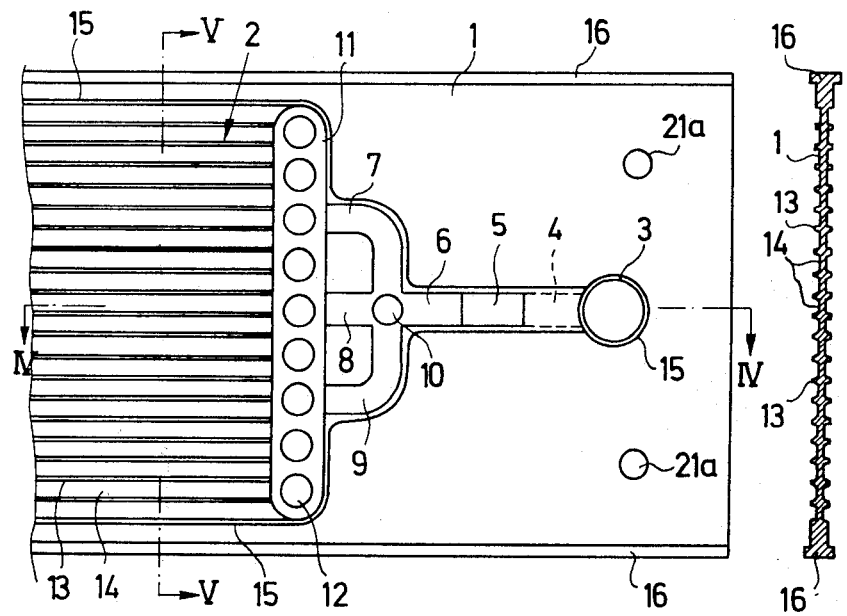
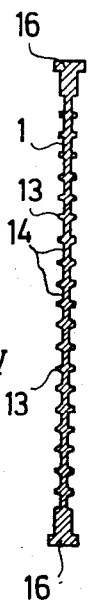
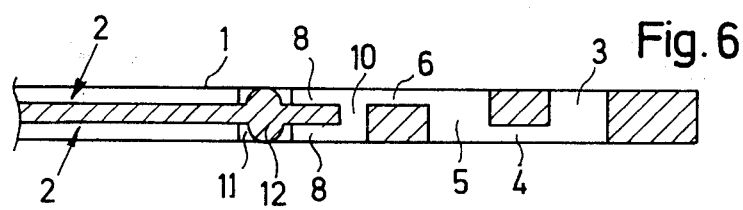
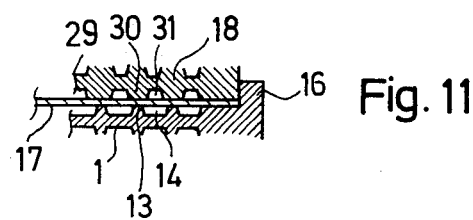

DIALYSIS APPARATUS FOR PURIFICATION OF A MEDIUM, PREFERABLY BLOOD

The present invention relates to a dialysis apparatus for the purification of a medium, preferably blood, whereby contaminants present in said medium are caused to diffuse through semi-permeable diaphragms out into a purification medium, preferably a purification liquid, to remove the contaminating particles.

Dialysis apparatus with semi-permeable diaphragms often include a series of disk-shaped elements provided with passage systems. Between each pair of disk-shaped elements two semi-permeable diaphragms are inserted so that these lie against the sides of the of the elements provided with the passage systems when the elements are placed in a packet that is kept together by means of clamp means or the like.

In dialysis apparatus of this kind, the blood—the medium to be purified—is fed between the pairs of diaphragms, and the same is caused to flow through passages which are formed since the diaphragms give way somewhat into the passages of the disk-shaped elements. At the same time the purification liquid is fed to flow through the passage spaces located outside the diaphragms, i.e., adjacent the disk-shaped elements.

In dialysis apparatus of the kind mentioned above and with the disclosed manner of operation it has been proven difficult to cause the blood to flow uniformly distributed along all the parts of the disk-shaped elements. Thus, the diaphragms have a tendency to extend relatively far into the passages in certain parts of the passage system, while the same extend into passages in other parts of the passage system to essentially lesser or inappreciable extent. As a result, the flow passages for the blood obtain varying depths, which include a risk that certain parts of the passage system between the diaphragms are not percolated at all. Furthermore, in unfavorable cases the blood may be left standing or resting in certain of the flow areas between the diaphrams, resulting in coagulation of the blood.

Another disadvantage of the use of the mentioned dialysis apparatus lies in that the volume of the flow area between the diaphragms is difficult and almost impossible to be determined exactly. The actual volume will namely be dependent upon the yielding characteristics of the diaphragm, the material and the tension of the diaphragms, the pressure of the blood flow and the pressure of the purification liquid. As a result, this volume may only be estimated instead of exactly determined, and, as an example, the volume may be considerably greater than the estimation disclosed, resulting in that a portion of the blood is not recirculated to the patient after the treatment.

The object of the present invention is to eliminate these drawbacks and provide a dialysis apparatus wherein the volume or space for the blood flow is unambiguously defined without dependence upon the yielding characteristics of the diaphragm material, the tension of the diaphragms, the pressure of the flow and the like. The dialysis apparatus according to the invention is illustrated in the following claims.

Figure 2:
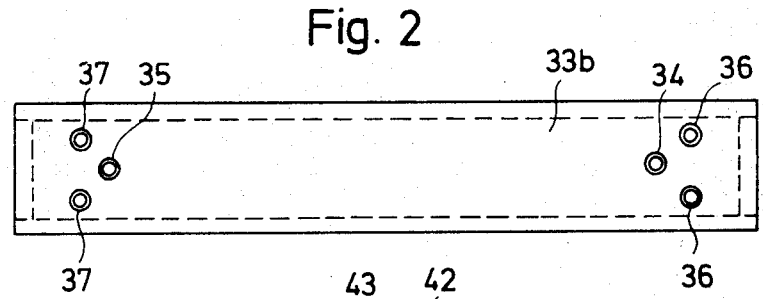
Figure 3:
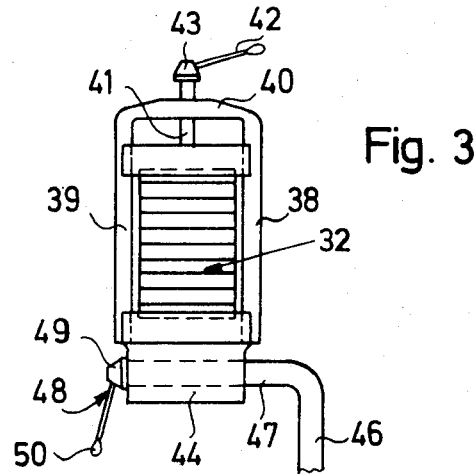
Figure 7:
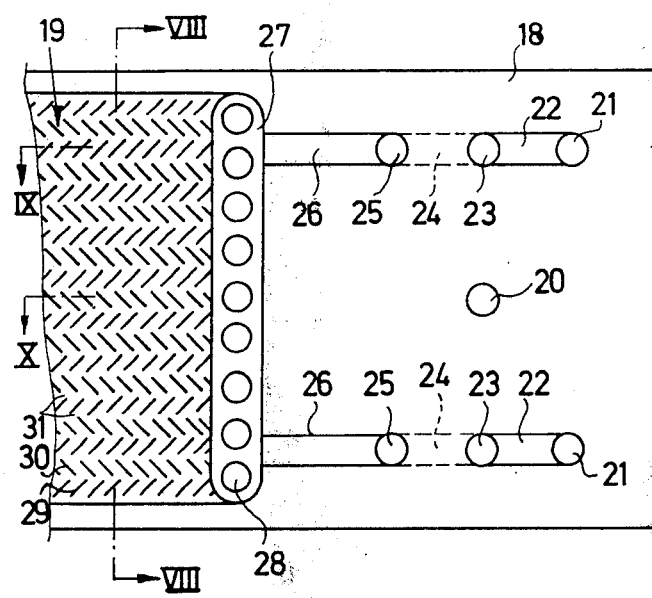
Figure 8:
Figure 9:
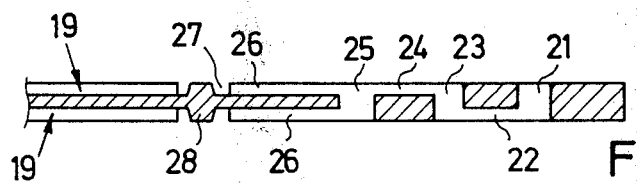
Figure 10:
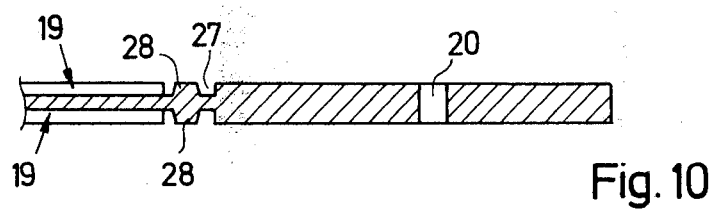

The invention will be further explained with reference to the accompanying drawings, wherein:

FIG. 1 is a side view of the dialysis apparatus according to the invention in an assembled condition, FIG. 2 is a planar view of a clamping plate in the dialysis apparatus, FIG. 3 is a front view of the dialysis apparatus mounted on a supporting arm, FIG. 4 is a planar view of a portion of a plate for blood in the dialysis apparatus, FIG. 5 illustrates a section V—V in FIG. 4, FIG. 6 illustrates a section VI—VI in FIG. 4, FIG. 7 is a planar view of a portion of a plate for the purification liquid in the dialysis apparatus, FIG. 8 is a section VIII—VIII in FIG. 7, FIG. 9 illustrates a section IX—IX in FIG. 7, FIG. 10 illustrates a section X—X in FIG. 7, and FIG. 11 is a section through a portion of a blood plate placed in correct position in relation to a plate for the purification liquid and a diaphragm lying between the plates.

According to the invention the blood is caused to flow through a passage or channel system, that is unambiguously defined and designed to give a very small flow resistance. As a consequence, the dialysis apparatus according to the embodiment includes a number of so-called blood plates 1, which are elongated and have a similarly designed passage system 2 on the opposite sides thereof and which are preferably made from a plastic material or stainless steel that has been made sterile, and furthermore, said plate is suitably rigidly shaped. Each blood plate 1 is provided with a blood inlet hole 3 running through the plate at one end portion thereof. This hole or opening 3 communicates with passage system 2 by means of passage branches 4, 5, 6, 7, 8, 9 and 10 and by means of a transverse blood distribution passage 11, whereby a series of distributors are provided in the same, comprising circular bosses 12. The passage system 2 originates from this blood distribution passage 11 and the same includes a series of longitudinal ribs 13 to define narrow, longitudinal passages 14. These passages 14 open into a blood distribution passage having distributors in the other end portion (not shown) of the plate and passage branches project from the distribution passage to blood discharge openings. The passage branches and the discharge opening are preferably designed and provided in the same manner in the two end portions of the plate. The blood plate 1 is provided with a projecting flange 15, which surrounds the inlet opening 3, all the passage branches and the passage system 2, in order to enclose the blood flow spaces together with a diaphragm 17. Further, the blood plate 1 is provided with longitudinal edge flanges 16 to permit securing of other plates. Two holes 21 for the purification liquid are provided in the two end portions of the blood plate 1. The design of the blood plate 1 may vary and in a suitable variation to an embodiment, pressure equilizing holes may be provided in the passage branches 7 and 9 (optionally also in the fork 8). The ribs 13 may be shaped as ridges or some other kind of bosses.

Further, the dialysis apparatus according to the invention includes a number of elongated plates 18 for the purification liquid. According to an embodiment, each plate 18 is provided with a similar passage system 19 on the opposite sides thereof, and said plate is made of a plastic material or stainless steel; furthermore the same is rigid or almost rigid in shape. One end portion of the plate 18 is provided with a hole 20 for blood flow and two holes 21 to feed purification liquid to the passage system 19. Each one of the holes 21 communicates with the passage system 19 by means of passage branches 22, 23, 24, 25 and 26, where the latter passage branch 26 opens into a transverse distribution passage 27 having distributors shaped as circular bosses 28. The actual passage system 19 projects from this distribution passage 27, which is designed to give the purification liquid a direction of flow that at all times diverges in different directions in relation to the longitudinal direction of the plate 19. To accomplish this purpose the actual passage system is provided with ribs 29, 30, ridges or bosses of some other kind. The ribs 29 are obliquely directed in relation to the longitudinal direction of the plate 18 and lie in straight lines, and the ribs 30 are obliquely directed in a different direction in relation to the longitudinal direction of the plate 18. The rows of ribs 29, 30 are located at a distance from each other to define straight flow passages 31 for the purification liquid. Alternatively, the ribs in every second row may be so displaced in relation to the ribs in the rows inbetween that one end edge of the ribs in the first-mentioned rows may lie in imagined straight lines positioned transverse to the longitudinal direction of the rows and furthermore through or almost through the center point between the end edges of pairs of ribs located one after the other in the rows lying inbetween. In a second alternative the ribs in each row may be so arranged and dimensioned that between two adjacent lines a flow space having zig-zag shape is formed. The passage system 19 opens into a transverse distribution passage (not shown) and the other end portion of the plate 18 is provided with passage branches similar to those in the first end portion, and these passage branches open into discharge openings for the purification liquid. Further, the second end portion has a hole through which the blood flows.

The plates 18 are of such a width that the same fit between the flanges 16 of the blood plate 1 (FIG. 11). A diaphragm 17 is inserted between the plates 1 and 18, with diaphragm is of a semi-permeable type. This diaphragm 17 is designed to permit diffusion of blood contaminants so that these contaminants may be removed by the purification liquid. By the mounting of the plates 1 and 18, the diaphragm 17 located therebetween will be fixedly positioned between the passage systems 2, 19, since portions of the ribs 29, 30 in the plate 18 are located right in front of the ribs 13 in the blood plate 1. In other words, only the portions of the diaphragm 17 located above the respective flow passages in the plates 1, 18 will be freely exposed, which results in that the exposed diaphragm portions are held planar or nearly planar. As a result, the flow passages 14 in the passage system 2 of the blood plate 1 are sharply defined by the plate 1 and by two ribs 3 on three sides and on the fourth side the passages are sharply or almost sharply defined by the diaphragm 17. In a similar manner, the flow passages 31 and the plate 18 are sharply defined at three sides thereof and nearly sharply defined at the fourth side. When the diaphragm 17 is inserted between the plates 1, 18 the same will also (with aid of the flange 15) seal and define the passage branches and passage system of the blood plate 1 from the atmosphere and from the plate 18, and at the same time seal the plate 18 from the atmosphere.

As an alternative to the mentioned one-bladed diaphragm 17, the same may pair-wise be included as two sides in a longitudinal bag-shaped cover (not shown). Said cover is dimensioned to permit insertion of a blood plate 1 so that the opposite sides of the cover lie outside the two passage systems 2 of the blood plate 1. This design of the diaphragm enables the blood plate 1 to be kept sterile and delivered totally encapsulated.

The dialysis apparatus according to the invention is assembled in such a manner that a number of blood plates 1 and plates 18 for the purification liquid with the diaphragm 17 placed therebetween are placed in a stack 32 between the two clamp plates 33a and 33b provided with two holes 34, 35 for a blood supply line and a blood discharge line, and four holes 36, 37 for two supply lines for the purification liquid and two discharge lines for the purification liquid. The clamp plates 33a, 33b are totally rigidly-shaped, and the same may comprise plates having a passage system for blood or purification liquid on one side thereof.

In the embodiment, one clamp plate 33a is included in a frame comprising two parallel sides 38, 39. These sides, each located on one side of the stack 32, project past the second clamp plate 33b and are connected to a transverse side 40. A threaded spindle 41 is screwed into this transverse side (into a threaded hole or a threaded sleeve), which spindle may be rotated by means of a handle 42. The spindle 41 in the upper end thereof is provided with an anchor 43 for the handle, and this anchor 43 includes an adjustable device for setting of different torques. The device for the setting of the torques is designed in a manner known per se and therefore will not be further described. By the aid of this or a similar clamping device for plates 1, 18 of the stack 32 may be held together in the required manner, i.e., so that a sealing action between the plates is obtained.

In order to enable stable location of the dialysis apparatus according to the invention adjacent the bed of a patient, the frame or clamp plate 33a is provided with a bearing part 44 having a hole 45. One arm 46 is mounted adjacent the patient's location, which arm may be included in a floor stand or a bracket (not shown) for the wall or the bed, and which has an end portion 47 horizontally directed which projects into the hole 45 when the dialysis apparatus is located for treatment. As a result of this location of the dialysis apparatus, the same may be turned according to need in relation to the end portion 47 and optionally also be displaced along this. The dialysis apparatus is suitably maintained in the set position on the end portion 47 by means of a clamping device 48 that may include a threaded sleeve 49, which is provided with a handle 50 and which may be screwed into the end portion 47.

After mounting of the dialysis apparatus, a cylindrical hole making element of any suitable kind is pushed through 34–37 in the clamp plate and through the holes in the blood plate 1 and plate 18 for purification liquid (after the mounting, respective holes in the plates are exactly centered in relation to each other and to the holes 34–37 in the clamp plate) so that said element opens holes in the portions of the diaphragms that are located between the end portions of the plates. A tube having an obliquely cut end is preferably used as the hole making element, and this tube may be so designed that the same may be used as a coupling between the dialysis apparatus and lines for blood and purification liquid to and from this. After the connection of said inlet and outlet lines (not shown), blood is fed through hole 34. The blood passes the holes 20 in the plate 18 for the purification liquid and is hindered by the diaphragms 17 that seal this, to flow to the passage system 19. When the blood flow passes the hole 3 in the blood plate 1, a portion of this blood flow will pass the passage branches 4, 5, 6, 10, 8 and 11 and the passage systems 2, whereafter the blood flow passes straight through the passage branches, the outlet hole in the opposite end portion of the blood plate 1, and in a purified state through the hole 35 and back through an outlet line connected to this hole 35. The purification liquid is fed via inlet lines through, for example, the holes 36 and the same flows through holes 21a in the blood plate 1, whereby the adjacent diaphragm 17 prevents removal of purification liquid to the passage system 2. When, on the contrary, the purification liquid passes the holes 21 in the plate 18, a portion of the liquid flow will pass through the passage branches 22, 23, 24, 25, 26 and 27 and the passage system 19, and thereafter discharge removed blood contaminants through passage branches and discharge holes in the other end portion of the plate 18 to the holes 37 and out from these holes via outlet lines.

When the blood has passed the passage branches 7, 8 and 9 the blood stream will be distributed along the width of the blood plate 1 by the aid of the distribution passage 11 and the distributors 12. By making these distributors 12 circular—the same may be alternatively by elliptically shaped—turbulence in the blood stream is eliminated and this is directed into all the passages 14 in the passage system 2. As a result of the straight design of the passages 14, the blood will flow with the least resistance possible which means that normally, an additional assembly increasing the natural blood pressure is not required.

As a consequence of the mentioned design of the passage system 19 of the plate 18, the purification liquid will flow in different side directions in relation to the blood streams in the passages 14. This means that a very favorable diffusing effect through the diaphragms 17 is obtained at the same time as the said diaphragms are located planar or nearly planar over the passage system 2 of the blood plate 1 so that the volume of the passing flow may be exactly or nearly exactly determined.

The embodiment and disclosed alternatives may be varied within the scope of the following claims. For example, the diaphragms 17 may be held in a planar and stretched position between the plates by engaging planar parts of the same, and these planar parts may optionally be provided with bosses and grooves corresponding thereto in order to secure the diaphragms 17.

I claim:
1. In a dialysis apparatus embodying a plurality of stacked alternating first and second fluid-directing flow plate elements sealingly separated from one another by a semi-permeable diaphragm member providing separate fluid flow passage systems on opposite sides of the diaphragm member for passage respectively of a medium to be purified, and of a purification medium, wherein a supply and discharge of the respective mediums is obtained through supply and discharge conduit means connected with respectively separate hole and passage means in end portions of said stacked elements and communicating with said respective flow passage systems; the improvement comprising:
   a. a first flow passage system for the medium to be purified including a plurality of longitudinally elongated parallel ribs uniformly spaced on opposite sides of the first flow plate element, said ribs providing straight, unimpeded, constant direction flow paths;
   b. a second flow passage system for the purification medium including a plurality of series of longitudinally aligned parallel ribs on opposite sides of the second flow plate element, which plurality of series are arranged longitudinally in a side-by-side manner and laterally separated slightly by longitudinally directed flow passages, the ribs of each respective series being angled differently from those of each adjacent series effecting constantly changeable flow patterns of the purification medium flowing therethrough;
   c. wherein the respective ribs of said first and second flow plate elements are of substantially the same height from a planar base portion thereof, and respective patterns of the ribs and rib series are the same in number and disposed so as to be substantially opposite one another when in interleaved assembly with the apparatus, thereby maintaining the interposed diaphragm member in positively gripped condition and substantially uniformly spaced from the planar base portions of said plate elements.

2. The apparatus of claim 1 wherein said stack of alternating first and second plate elements includes a pair of opposed end plates, and the second flow plate elements which are interposed therebetween being provided on opposite sides thereof with the same plurality of series of ribs arranged in a same back-to-back manner.

3. The apparatus of claim 1 wherein said longitudinally directed flow passages between the respective series of angularly disposed ribs on said second plate elements extend the full length of said rib series, whereby the flow of said purification medium therethrough is at least partially diverted from the longitudinal direction into lateral zig-zag flow patterns established by the zig-zag orientation of each adjacent pair of series of ribs thereon.

4. The apparatus of claim 1, wherein each flow plate element includes elongated transverse fluid distribution channel means disposed transversely to and communicating with the respective ribs and rib series at opposite ends of said plate elements, the said channel means communicating with said respective hole and passage means of said plate elements.

5. The apparatus of claim 4, further including generally hemispherical distributor means spaced along said fluid distribution channel means to better distribute the medium in the passage systems.

6. The apparatus of claim 1, including marginal sealing ribs surrounding said longitudinally oriented ribs and series of ribs and their respective distribution channel means and supply and discharge hole and passage means, said sealing ribs providing sealing engagement with the interleaved diaphragm members.

7. The apparatus of claim 1, wherein said first plate elements are provided with at least laterally marginal raised flanges extending on opposite sides, adapted to orient and facilitate assembly thereof with said second type plate elements which are of a size to complementarily fit between said raised marginal flanges.

8. The apparatus of claim 1 wherein a clamp is provided in conjunction with said interleaved stack, said clamp including means to apply an adjustable degree of clamping pressure to the assembly of interleaved plate elements.

9. The apparatus of claim 8, wherein said clamp includes a band-like framework disposed around the assembly of interleaved stack plate elements, one end member of the framework being spaced from said stack and having a threaded hole therein, a threaded bolt extending through said threaded hole with an end of said bolt adapted to engage said stack, and a handle attached to an opposite end of said threaded bolt for applying adjustable clamping pressure thereto.

* * * * *